UNITED STATES PATENT OFFICE.

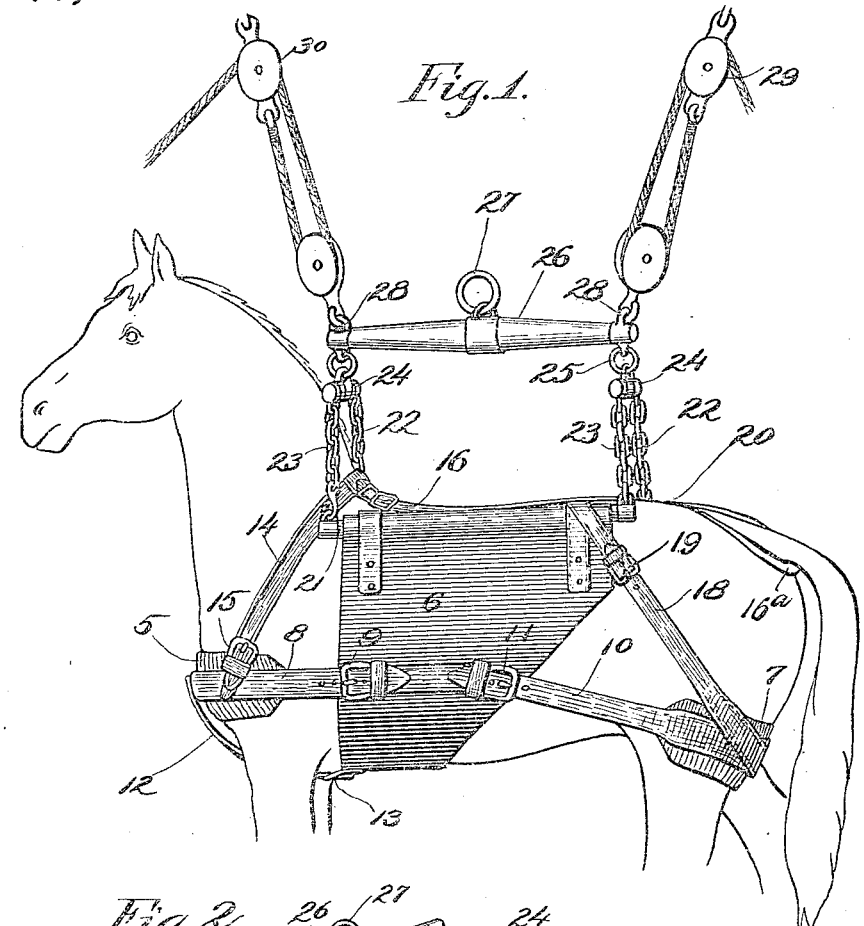
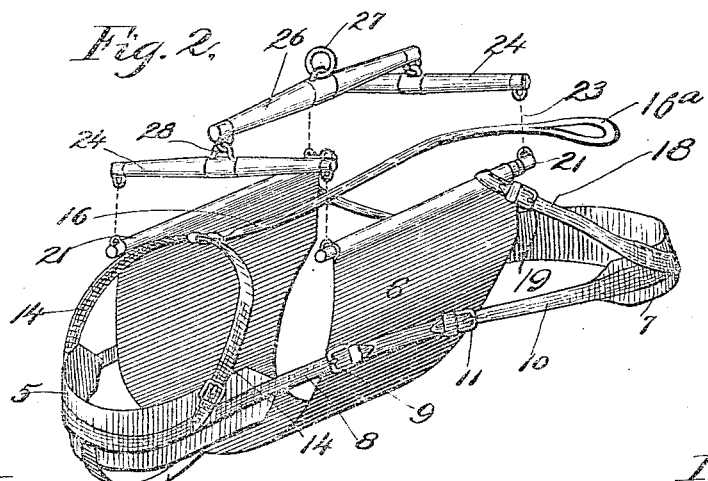

SOLA B. DUNN, OF CHICAGO, ILLINOIS.

HORSE-SLING.

1,277,052.   Specification of Letters Patent.   Patented Aug. 27, 1918.

Application filed March 12, 1917. Serial No. 154,166.

*To all whom it may concern:*

Be it known that I, SOLA B. DUNN, a citizen of the United States, residing at Chicago, in the county of Cook and State of Illinois, have invented certain new and useful Improvements in Horse-Slings, of which the following is a specification.

My invention relates to an improvement in the class of harness for slinging or suspending animals more particularly horses for therapeutic purposes.

The principal object of my invention is to provide an improved sling whereby animals may be raised from the floor without swinging.

A further object of my invention is to provide an improved sling by means of which either end of an animal may be raised without raising both ends.

A still further object of my invention is to provide an improved animal sling which will be simple in construction, convenient in use and efficient in operation.

In the accompanying drawings which illustrate the preferred form of the sling made in accordance with my invention as applied to a horse, Figure 1 is a side view of a sling made in accordance with my invention as applied to a horse, and Fig. 2 is a perspective of the sling itself.

The sling comprises a breast band 5, a body band 6 and a breeching 7. The bands 5, 6 and 7 are made of any suitable material and if desired may be provided with proper padding. Breast band 5 is joined to body band 6 by a strap 8 the ends of which are fastened thereto by suitable means such as a buckle 9 properly secured to the body band. In like manner breeching 7 is adjustably secured to body band 6 by a strap 10 held by buckle 11. A strap 12 connects the neck band 5 with the body band 6 and extends between the fore legs of the animal, this being adjustably connected with the body band 6 by means of buckle 13. For holding the breast band in place there is provided a collar 14 connected to the band 5 with buckles 15. Attached to collar 14 and adapted to extend along the back of the animal is an extension 16 connected with a crupper 16ª. Rump straps 18 are adjustably connected to the rear upper ends of the body band 6 by buckles 19 and extend from the opposite sides of the breeching.

The body band 6 is made in a novel manner in that the intermediate or central portion is restricted in width and the end portions are relatively wide, the purpose being to afford sufficient width at the end portions for applying power to raise the animal when in the sling and the intermediate portion is made much narrower than the end portions so that the portion of the body band which directly supports the animal will extend over the bony parts only and not over the abdominal region. Properly secured to the end portions of the body band 6 are bars 21. Connected to the front and rear ends of the bars 21 by chains 22 and 23 are cross-trees 24 which are provided with proper means such as rings 25 to which a suspending device may be attached. Suspension tree 26 extends longitudinally of the device, that is parallel with the animal in the sling and is connected at its ends to the connecting rings 25 on the cross-trees 24. The suspension tree 26 is provided with a central ring 27 and end connections 28 to which proper hoisting means may be attached. In the preferred form of the sling as shown I have chosen to employ two blocks and tackles 29 and 30 separately connected to front and rear rings 28 on the suspension tree 26, whereby either end of the animal may be lifted clear of the floor without any swinging resulting.

It is often necessary to raise either the fore or hind legs of an animal while being treated and that the present type of sling has been inadequate for such use, also the present day type of sling permits the animal when suspended to swing about the point of suspension which swinging is undesirable at all times. By the improved device I am able to hoist the animal clear of the floor without any swinging resulting and also to raise either the front or rear end. It is, of course, understood that a block and tackle might, if occasion required be connected to the ring 27 of the suspension tree 26 which would raise the animal as a whole but would not raise either end alone. It is, however, usually preferable to use the double block and tackle as shown, in order to prevent longitudinal swinging of the horse and to permit the separate lifting of either his front or hind feet.

It is preferable when using such a sling that the weight of the horse be borne on the bony structure, and to this end I have devised the novel body band as above described. To permit the raising of either the front or rear end I have provided the breast band and breeching properly connected to and adjustable with the body band. I have also provided rump straps which I prefer to connect to the rear end portions of the body band 6 and bars 21, so that when the rear end of the animal is raised there will be no chance of the rump strap slipping and permitting the animal to fall. Furthermore, proper arrangement of straps and connections makes possible the raising of the animal by bearing against the bony structure of its body. It is possible with such a device to leave the animal suspended for a long time without discomfort.

I do not limit myself to the exact form and arrangement described and shown as I realize that considerable variations in such a device are possible. Such variations I have considered as coming within the scope of my invention.

Having fully described my invention, what I claim is:

1. A sling of the character described, comprising in combination a breast band to extend in front of the fore legs, a body band, a breeching, strap connections between the breast band and body band, and between the breeching and body band, and front and rear elevating mechanisms independently and readily operable when supporting an animal.

2. A sling of the character described, comprising in combination a breast band to extend in front of the animal and having a strap adapted to extend between the fore legs of the animal, a body band connected with said strap and having a narrowed intermediate portion and wide end portions, the intermediate portion extending beneath the animal's ribs and short of the abdominal region, a breeching having adjustable strap connections with the body band, adjustable strap connections between the breast band and body band, cross-trees flexibly connected to the end portions of the body band and at right angles thereto, rump straps extending from said breeching to and connected with the body band adjacent its rear upper ends, a collar for said breast band terminating in a crupper, and means for separately actuating said cross-trees, substantially as described.

3. A sling of the character described, comprising in combination a breast band to extend in front of the fore legs, a body band having a restricted central portion positioned behind the fore legs and extending rearwardly over the animal's body and terminating short of the abdominal region, a breeching having strap connections with said body band, a strap supporting said breast band and having a connection extending along the back of the animal, cross-trees flexibly connected to the extremities of the end portions of the said body band, a longitudinally disposed suspension tree connected to said cross-trees, suspending connections thereon, a strap extending from each side of said breeching to said body band adjacent its upper rear ends and means for actuating said sling whereby either end of the animal may be raised independently of the other end, or the animal raised as a whole, substantially as described.

4. A sling of the character described, comprising in combination a breast band to extend in front of the fore legs, a body band, a breeching, strap connections between the breast band and body band, and between the breeching and body band, cross-trees flexibly connected to the front and rear extremities of said body band, means connected with said cross-trees for separately raising or lowering the same, and straps extending from the sides of the said breeching to the body band adjacent its upper ends, substantially as described.

5. A sling of the character described, comprising in combination a breast band to extend in front of the fore legs, a body band having a restricted central portion positioned behind the fore legs and extending rearwardly over the animal's body and terminating short of the abdominal region, a breeching having strap connections with said body band, a strap supporting said breast band and having a connection extending along the back of the animal, cross-trees flexibly connected to the extremities of the end portions of said body band, a longitudinally disposed suspension tree connected to said cross-trees, suspending connections thereon, and means for actuating said sling whereby either end of the animal may be raised independently of the other end, or the animal raised as a whole, substantially as described.

6. A sling of the character described, comprising in combination a breast band to extend in front of the fore legs, a body band having a restricted central portion positioned behind the fore legs and extending rearwardly over the animal's body and terminating short of the abdominal region, a breeching having strap connections with said body band, a strap supporting said neck band and having a connection extending along the back of the animal, side bars secured in the upper ends of said body band, cross-trees flexibly connected to said side bars, a longitudinally disposed suspension tree connected to said cross-trees, suspending connections thereon, a strap extending from the opposite sides of said breeching to the adjacent end portions of said body band inwardly of said cross-tree connections, and means for actuating said sling whereby either end of the animal may be raised independently of the other end, or the animal raised as a whole, substantially as described.

7. In a sling of the character described, the combination of a body band adapted to extend under the bony parts of the animal and terminate short of the abdominal region, cross trees flexibly connected to the front and rear extremities of the ends of the breast band, a spreader joining the cross trees, means connected to the cross trees for separately raising or lowering the front or rear end of the animal, breast and breeching straps adjustably connected to the body band, a rump strap secured to the breeching and adjustably connected to the rearward upper ends of said body band, substantially as described.

Signed at Chicago, State of Illinois United States of America this fifth day of March A. D., 1917.

SOLA B. DUNN.

Copies of this patent may be obtained for five cents each, by addressing the "Commissioner of Patents, Washington, D. C."